United States Patent [19]
Larson et al.

[11] Patent Number: 4,910,777
[45] Date of Patent: Mar. 20, 1990

[54] PACKET SWITCHING ARCHITECTURE PROVIDING ENCRYPTION ACROSS PACKETS

[75] Inventors: Mikiel L. Larson, St. Charles; Gustavus H. Zimmermann, III, Naperville, both of Ill.

[73] Assignee: AT&T Bell Laboratories, Murray Hill, N.J.

[21] Appl. No.: 247,121

[22] Filed: Sep. 20, 1988

[51] Int. Cl.[4] .............................................. H04L 9/00
[52] U.S. Cl. ........................................ 380/49; 380/9
[58] Field of Search .............................. 380/9, 48, 49

[56] References Cited
U.S. PATENT DOCUMENTS

| | | | |
|---|---|---|---|
| 4,160,120 | 7/1979 | Barnes et al. | 380/49 |
| 4,249,180 | 2/1981 | Eberle et al. | 380/49 |
| 4,596,898 | 6/1986 | Pemmaraju | 380/49 |
| 4,638,356 | 1/1987 | Frezza | 380/7 |
| 4,642,424 | 2/1987 | McNair | 380/48 |
| 4,661,657 | 4/1987 | Grenzebach et al. | 380/48 |
| 4,720,859 | 1/1988 | Aaro et al. | 380/23 |
| 4,736,377 | 4/1988 | Bradley et al. | 380/48 |
| 4,757,533 | 7/1988 | Allen et al. | 380/25 |
| 4,757,536 | 7/1988 | Szczutkowski et al. | 380/48 |
| 4,815,128 | 3/1989 | Makek | 380/9 |

Primary Examiner—Salvatore Cangialosi
Attorney, Agent, or Firm—John C. Moran

[57] ABSTRACT

Apparatus for preventing the unauthorized detection of the start and end of packets being communicated within a packet switching system. The packet switching system comprises a plurality of packet switching networks that are interconnected by trunks. Each switching network has a number of trunk controllers with each terminating one of the trunks interconnecting that network to other networks. Each controller has an encrypting circuit for only encrypting the flag of each packet before the packet is transmitted on the connected trunk and a decrypting circuit for decrypting the flag of each packet received from the connected trunk. The decrypting circuit on the receiving side of a trunk recovers flag synchronization with the encrypting circuit on the transmitting side of the trunk by the exchange of special packets. Each flag comprises a plurality of bytes. The decrypting circuit can automatically adjust for a predefined number of errors in the flag bytes or a predefined number of flag bytes appearing in the data of a packet.

17 Claims, 9 Drawing Sheets

STATE DIAGRAM FOR LOGIC 627
FIG. 7

PACKET SWITCHING ARCHITECTURE PROVIDING ENCRYPTION ACROSS PACKETS

TECHNICAL FIELD

This invention relates to an apparatus and method for performing data encryption. In particular, the invention relates to encrypting packetized data so that the start and end of a packet cannot be identified without the encryption algorithm being broken.

BACKGROUND OF THE INVENTION

Data encryption is well known and has been in use for a number of years. A problem arises in packet switching networks in that whereas it is possible to encrypt the data contained within the packet, the packet itself, as it is transmitted between packet switching networks via interconnecting trunks, is defined by flag and header information. Hence, the encryption of the data is not as effective since the amount of data being encrypted is relatively small, and the probability of the encryption algorithm being broken is greatly increased. Indeed, the packet header information contains the logical channel number which allows the identification of which packets are associated with particular frames being transmitted between packet switching systems.

Figure 1:
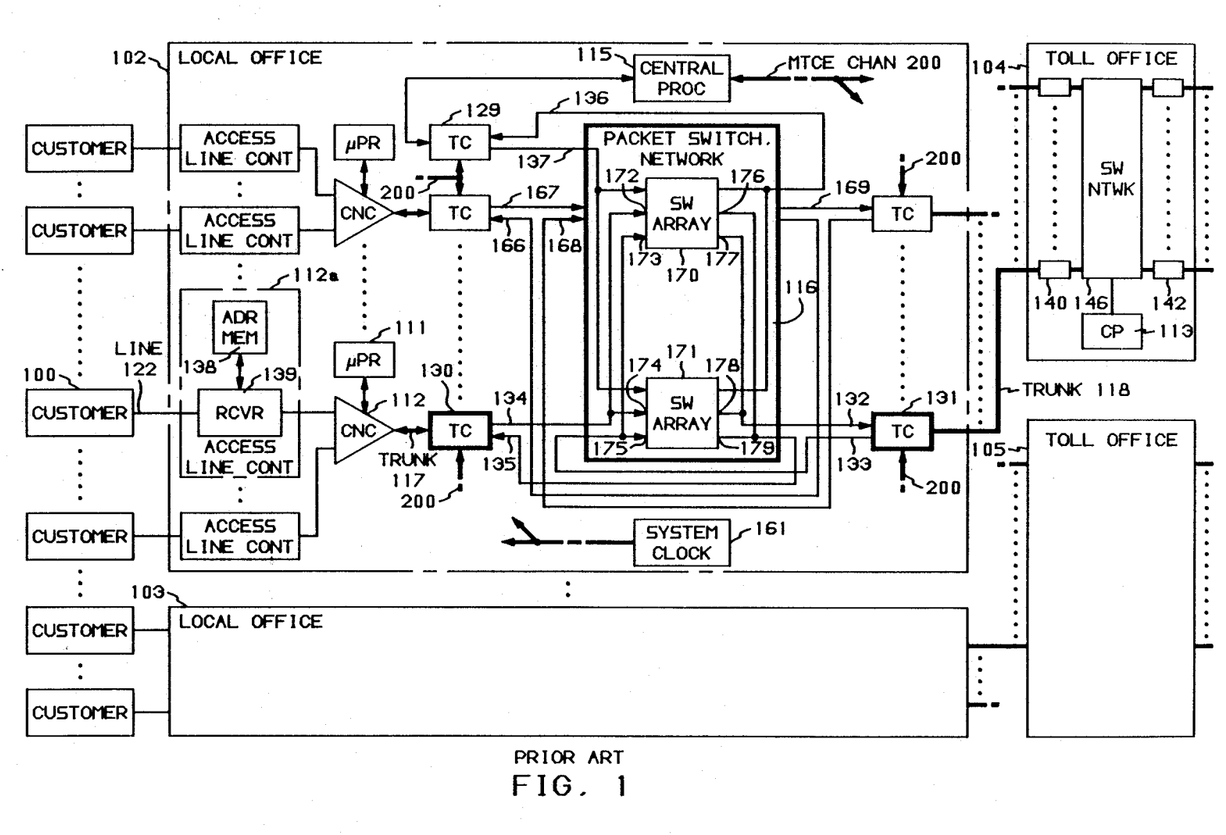
FIG. 1 illustrates, in block diagram form, a prior art communication system for performing packet switching.
Figure 2:
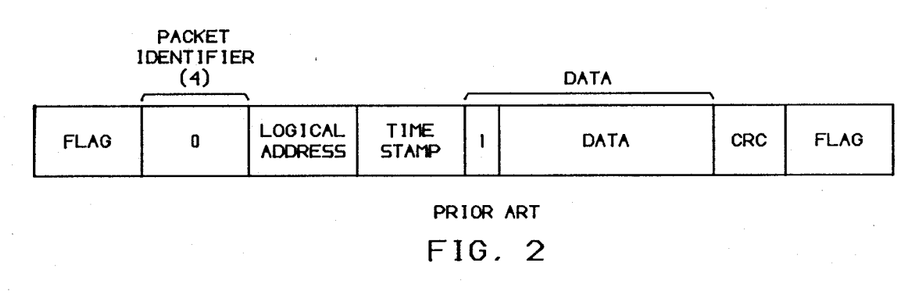
FIG. 2 illustrates the contents of a prior art packet which is routed via the system illustrated in FIG. 1.

One such prior art packet switching system is disclosed in U.S. Pat. No. 4,494,230, and is illustrated in FIG. 1. FIG. 2 illustrates the packet which would be transmitted in the packet switching system of FIG. 1 between customer 100 and customer 110. The data portion of the packet illustrated in FIG. 2 would be encrypted by customer 100 before transmission into the packet switching system, but the system adds flag information and the header information that consists of packet identifier, logical address, and time stamp fields. The packets in the above-cited U.S. patent are communicated via high-speed digital links across country via trunks such as trunk 118. These trunks could be microwave or satellite links. In the event that unauthorized personnel should gain access to trunk 118, the packets being communicated on trunk 118 would have the format illustrated in FIG. 2. Since the customer is only able to encyrpt the data portion of the packet of FIG. 2, the unauthorized personnel could readily break the encryption algorithm.

From the foregoing, it can be seen that there exists the need for a method of not only encrypting the data within a packet, but for encrypting the entire transmission path over which the packets flow, thus also encrypting the flag and header information. Whereas the present public key encryption systems perform extremely well in absence of errors, these systems require a large amount of processing, and more efficient and less intense processing algorithms are desirable. In the presence of errors, packets are likely to be lost during periods of re-synchronization using a public key encryption system.

SUMMARY OF THE INVENTION

In an illustrative method and structural embodiment, a departure in the art is achieved by a packet switching system which encrypts the flags that define the start and end of packets being communicated on links such as high-speed data transmission trunks. Furthermore, a procedure is provided for synchronizing the encryption of the flag information at either end of the trunk by the trunk controllers that connect directly to the high-speed digital trunk.

Advantageously, the structural embodiment comprises a circuit for encrypting only the flags prior to transmission on a trunk and a circuit for decrypting the flags upon receipt from the trunk. The decrypting circuit has a subcircuit for detecting when the decrypting circuit is no longer in flag synchronization with respect to the encrypting circuit. Upon detecting that flag synchronization has been lost, the latter subcircuit initializes the encrypting circuit by transmitting a predetermined packet to the encrypting circuit.

Advantageously, the encrypting circuit has a subcircuit for detecting the predetermined packet and for generating an initialization signal. The encrypting circuit has another subcircuit responsive to the initialization signal for initializing the encrypting circuit to generate a predetermined sequence of encrypted flags.

Also, the decrypting circuit has a detection subcircuit for detecting the predetermined sequence of encrypted flags. The detection subcircuit is responsive to the predetermined sequence to place the decrypting circuit in flag synchronization with the encrypting circuit.

In addition, each flag has a plurality of bytes, and the decrypting circuit has a maintenance subcircuit for maintaining synchronization upon up to a predetermined number of the flag bytes being incorrect within any particular flag. Also, the maintenance subcircuit maintains flag synchronization upon up to a predetermined number of the bytes of the current flag appearing in the data of the current packet.

A method prevents an unauthorized detection of the start and end of packets being transmitted in a packet switching system which has packet switching networks that are interconnected by trunks. Each network terminates a trunk with trunk controller. The method has the steps of only encrypting flags separating packets upon transmission of the packet on a connected trunk and decrypting the encrypted flags upon receipt of the packets from the connected trunk. The decrypting step includes the step of synchronizing with encrypted flags. The synchronizing step includes the steps of initializing the encrypted step to use a predetermined sequence of flags, detecting the predetermined sequence, and placing the decrypting step in flag synchronization with the encrypting step upon detection of the predetermined sequence.

BRIEF DESCRIPTION OF THE DRAWING

In general, system elements, when first introduced on a figure, are each designated with a number that uses the figure number as the most significant digits of the element number.

DETAILED DESCRIPTION

Figure 3:
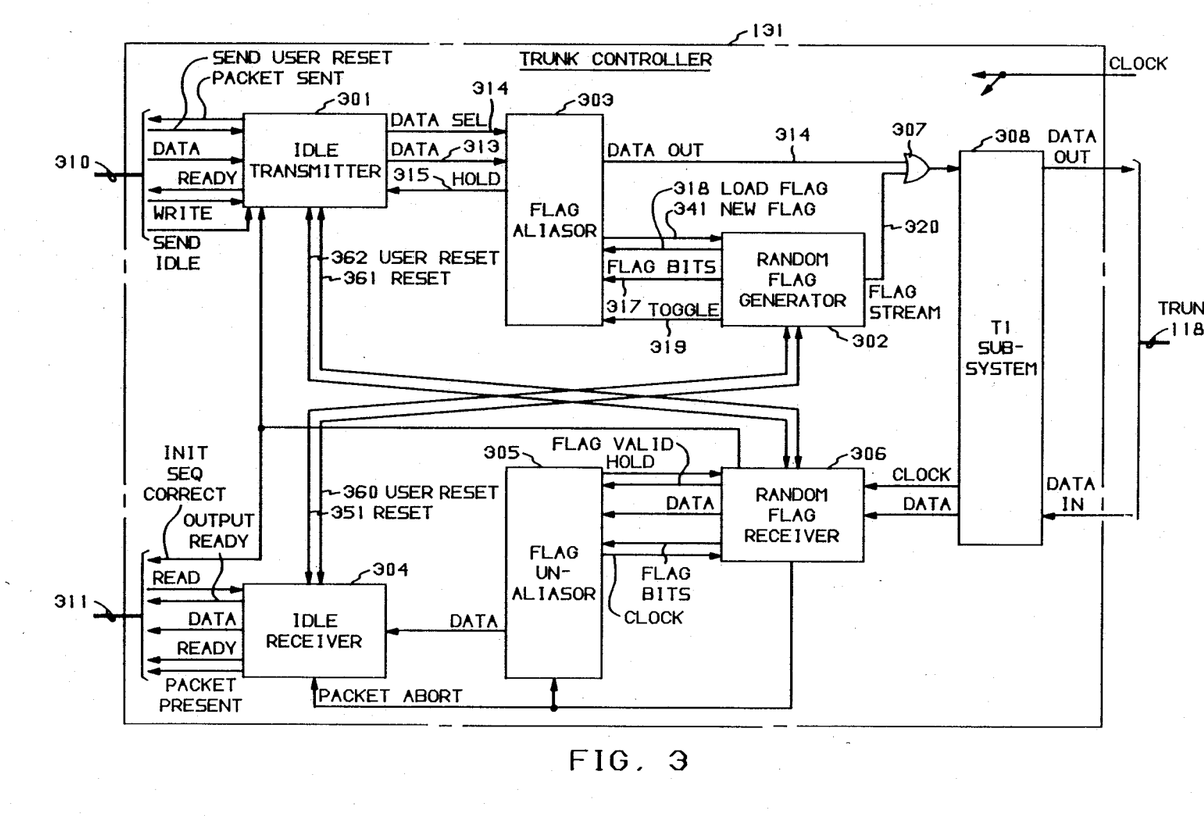
FIG. 3 illustrates a portion of trunk controller 131 of FIG. 1 in greater detail.
Figure 4:
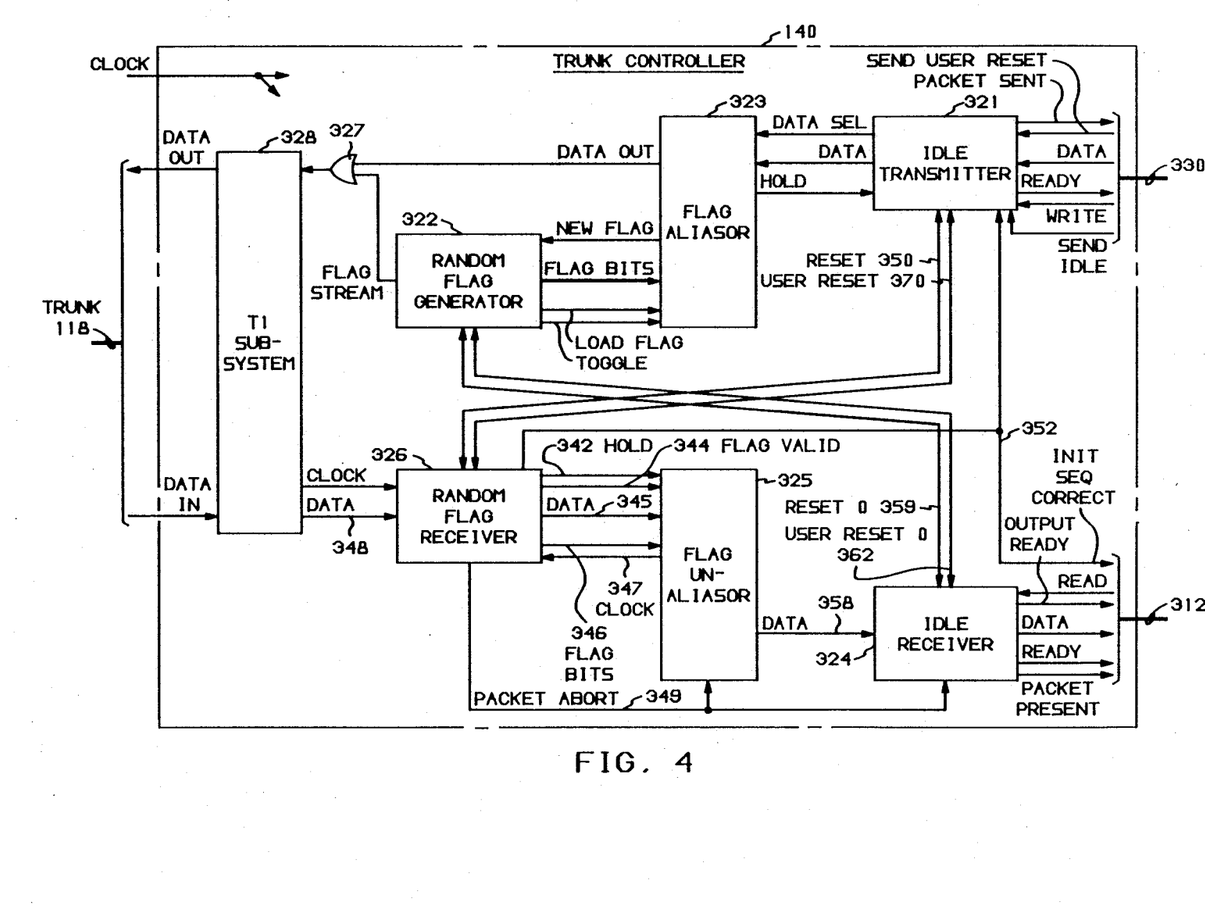
FIG. 4 illustrates a portion of trunk controller 140 of FIG. 1 in greater detail.

FIGS. 3 and 4 illustrate the trunk interface portions of trunk controllers 131 and 140 of FIG. 1 as modified by this invention. The packets transmitted by trunk controller 131 to trunk controller 140 via trunk 118 are identical in structure to those illustrated in FIG. 2 with the exception that the flag patterns are no longer the same for each packet, but rather are encrypted. The encryption of the flag makes it difficult to determine the start and end of individual packets from the data being continuously transmitted via trunk 118. The transmitter portion is made up of blocks 301, 302, 303 and 307 and the receiver portion comprises blocks 304, 305 and 306. The T1 subsystem 308 provides the interface to trunk 118. More details concerning this interface can be found in the previously referenced U.S. patent and in the Bell System Technical Reference, publication 41451, "High Capacity Terrestrial Digital Service", January, 1983, published by American Telephone and Telegraph Company.

Consider in greater detail the functions performed by the blocks of FIG. 3. First, consider the transmission from trunk controller 131 to trunk controller 140. It is assumed at this point that the trunk controllers are in synchronization both with respect to the data stream and the flag encryption. When the trunk controller has a packet to send, it transfers the packet to the idle transmitter 301 via the data and write links of cable 310. Before the transfer, the trunk controller must be receiving the ready signal from idle transmitter 301 via cable 310. Idle transmitter 301 is responsive to the start of the data to transmit the data select signal via conductor 314 and data via conductor 313 to flag antialiasor 303 if the hold signal is not being transmitted from block 303 to block 301 via conductor 315. Block 303 is responsive to previously received flag bits from random flag generator, RFG, 302 to perform a standard flag aliasing operation on the data being received via conductor 313 to assure that the start flag does not appear in the transmitted data. After the aliasing operation is performed, block 303 transfers the data via conductor 314 to the T1 subsystem 308 via OR gate 307. After the packet has been transmitted, block 303 detects this fact and transmits the new flag signal via conductor 341 to RFG 302. The latter block is responsive to the latter signal to transmit the end flag to T1 subsystem 308 via conductor 320 and OR gate 307. RFG 302 will continue to transmit flags to T1 subsystem 308 until the toggle signal is transmitted via conductor 319 from block 303. The transmission of the toggle signal indicates that block 303 has information to transmit to T1 subsystem 308. Block 303 does not commence transmission of this data until the load flag signal is received via conductor 318 from RFG 302. The latter block transmits the load flag signal after it has transmitted the last current flag via cable 317. The flags are variable and are being generated by random variable generator 302 in response to an initial seed as will be explained in greater detail with respect to FIG. 9.

At the receiving end, as illustrated in FIG. 4, as data is being received via trunk 118 by T1 subsystem 328, the latter subsystem recovers the clock and transfers the data via conductor 348 to random flag receiver, RFR, 326. When RFR 326 detects a start flag indicating the start of a new packet, it transmits the flag valid signal via conductor 344, blocks 324, and 365, and transfers the flag bits via conductor 346 to block 325. The flag valid signal indicates that the flag bits transferred via conductor 346 represented the start flag of a new packet. After RFR 326 has received the start flag for that packet, it commences to search for the start flag of the next packet. At this time, it has been assumed that RFR 326 and RFG 302 are in synchronization with respect to the flags. The method of achieving synchronization is described in greater detail later. As RFR 326 receives data, it transfers this data via conductor 345 along with a clock signal on conductor 347 to flag unaliasor 325. The latter block recovers the data which had been modified so that the flag did not appear in the data by block 303 and transfers this data to idle receiver 324. The latter receiver in turn transfers the information to the remainder of trunk controller 140 via cable 312.

The current flag to be utilized by flag unaliasor 325 is transferred from RFR 326 via cable 346, and RFR 326 indicates when these bits are valid by transmitting a flag valid signal via conductor 344. When RFR 326 detects the end flag, it indicates to block 325 that there is no more data by transmitting the hold signal via conductor 342 and stopping the transmission of the clock signal on conductor 347.

Flag unaliasor 325 transfers the data received from RFR 326 to idle receiver 324 after processing the data. Idle receiver 324 is responsive to the data received from block 325 to transfer this data to the remainder of trunk controller 140 via cable 312.

Data is transferred from trunk controller 140 to trunk controller 131 via trunk 118 in a manner similar to that just described.

The previous discussion has assumed that RFG 302 and RFR 326 were in synchronization with respect to the flags. If this synchronization is lost and RFR 326 detects that it is no longer receiving the correct flags, it transmits a reset signal via conductor 350 to idle transmitter 321. Idle transmitter 321 is responsive to the latter signal to transmit a reset packet. The latter packet may advantageously comprise data sequences which are not normally used and have been reserved for the reset packet. The reset packet is then transmitted via trunk 118 to RFR 306 which processes this packet in the normal manner transferring it via flag unaliasor 325 to idle receiver 304.

In response to the reset packet, idle receiver 304 transmits a reset signal via conductor 351 to RFG 302. The latter block is responsive to the reset signal to reset the random sequence of flag generation. Note that upon generating the reset signal, RFR 326 had also reset its random sequence of flags. Also in response to the reset signal, RFG 302 starts to transmit an initial flag sequence. RFR 326 detects the initial flag sequence and transmits the initial sequence correct signal via conductor 352 to idle transmitter 321. The latter block is responsive to this signal to cease transmission of the reset packets. Note, upon receiving the reset signal via conductor 350, idle transmitter 321 periodically transmits out reset packets.

Figure 5:
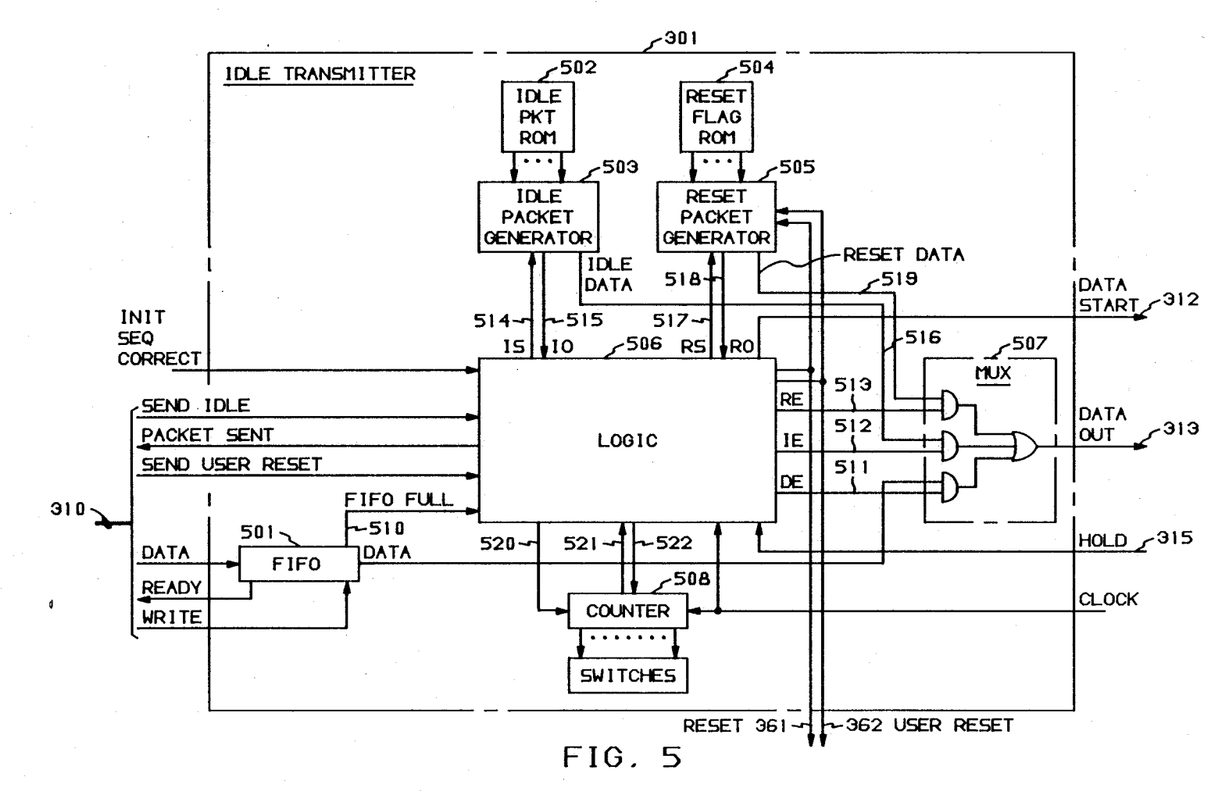
FIG. 5 illustrates, in greater detail, idle transmitter 301 of FIG. 3.

The above actions of resyncing the flags can also be accomplished at trunk controller 140 by the transmission of the send user reset signal via cable 330 in trunk controller 140 under either computer control or manual control as is described in greater detail with respect to FIG. 5. A similar mechanism is available in trunk controller 131.

Idle transmitter 301 is illustrated in greater detail in FIG. 5. During normal operations, when data is being transferred from the remainder of trunk controller 131 through idle transmitter 301, the packets flow through FIFO 501 to data out conductor 313 via multiplexer 507. The latter multiplexer is controlled by logic 506 in response to the FIFO full signal from FIFO 501 transmitted via conductor 510. Logic 506 controls the multiplexer by transmitting the DE signal via conductor 511. Idle packet transmission can be requested when there are no data packets to be transmitted and is requested as follows. If logic 506 receives the send idle signal via cable 310, logic 506 transmits the IS signal via conductor 514 to idle packet generator 503. In response, the latter generator accesses idle packet ROM 502 and transfers the data to conductor 313 via conductor 516 and multiplexer 507. Multiplexer 507 is controlled by logic 506 transmitting the IE signal via conductor 512. After the idle packet has been transmitted, generator 503 transmits the IO signal via conductor 515 to logic 506 thus informing the latter unit that the packet has been completely transmitted. It then stops transmitting the IE signal on conductor 512 to multiplexer 507 and retransmits the DE signal on conductor 511.

Logic 506 is responsive to the transmission of the send user reset signal on cable 310 to generate the user reset signal transmitted via conductor 360. Also, in response to the send user reset signal, logic 506 activates reset packet generator 505 by sending the RS signal via conductor 517. The latter generator is responsive to the RS signal to access reset flag ROM 504 for the sequence of bytes which constitute the reset sequence.

Generator 505 transmits the data to conductor 313 via conductor 519 and multiplexer 507. Logic 506 controls multiplexer 507 by transmitting the RE signal via conductor 513. After the packet generator 505 has finished transmitting the reset sequence, it indicates this fact to logic 506 by transmitting the RO signal via the conductor 518. The reset packet generated in this manner has the last byte consisting of all ones indicating that it was a user reset that caused the generation of the reset sequence. If the reset sequence occurs as a result of the generation of the reset signal transmitted via conductor 361, then, the last byte of the sequence will consist of all zeros.

An important aspect of the system is the automatic generation of a user reset and transmission of user reset packet after a fixed number of flags have been transmitted by the circuit illustrated in FIG. 5. The receipt of the user reset packet results in the seed/key registers in random flag generators 302 and 322 being increment resulting in a new flag sequence being generated. Counter 508 counts the number of flags that have been transmitted by RFG 302 in response to the clock signal received from T1 subsystem 308 and a signal transmitted via conductor 522 indicating that logic 506 is not presently controlling the transmission of a packet data via multiplexer 507. When counter 508 has counted to a predetermined limit, it transmits a signal to logic 506 via conductor 521 that causes the latter logic unit to respond as if it had received a user reset signal via conductor 361. Logic 506 then generates a user reset signal on conductor 361. Note that transmission on conductor 361 is bilateral, either block 301 or 306 can generate a user reset signal and transmit the user reset signal on conductor 361. This causes the previously described actions by generator 505 to be executed. Further, logic 506 performs the necessary operations in response to signals transmitted via conductors 312 and 315.

Figure 6:
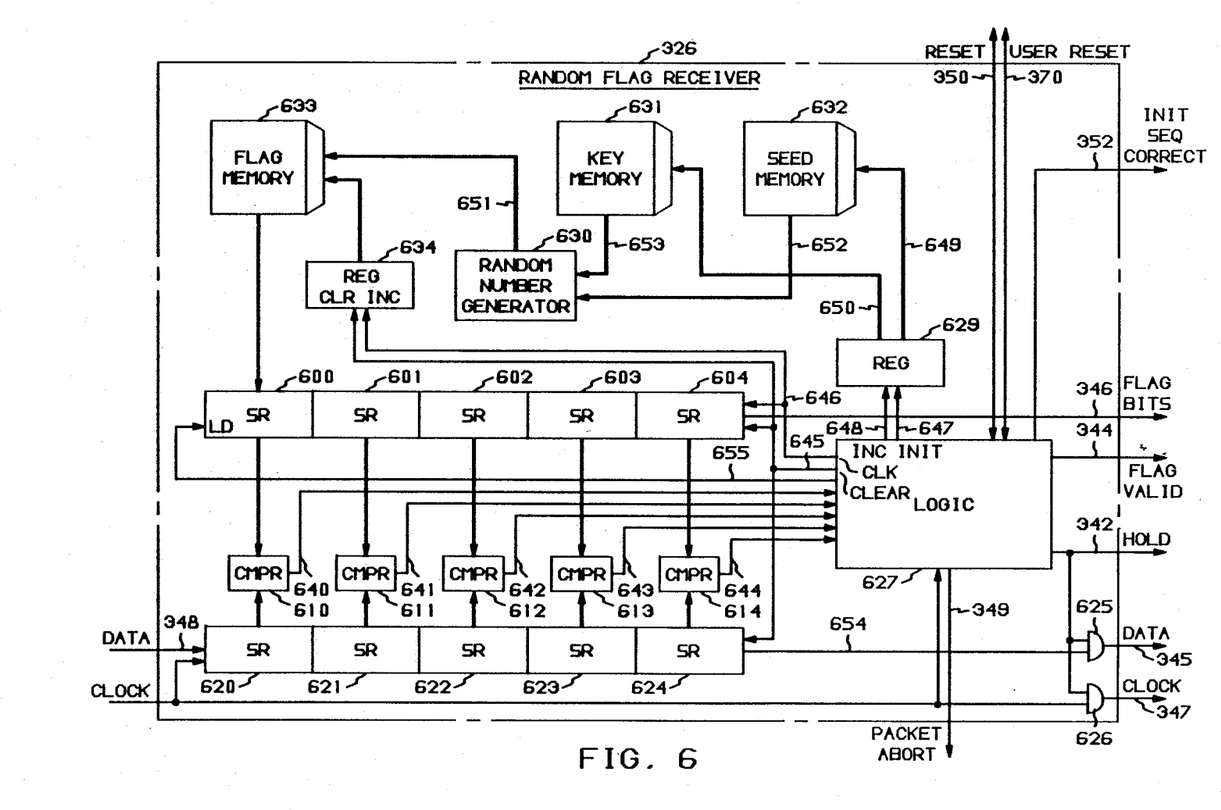
FIG. 6 illustrates, in greater detail, random flag receiver (RFR) 306 of FIG. 3.
Figure 7:
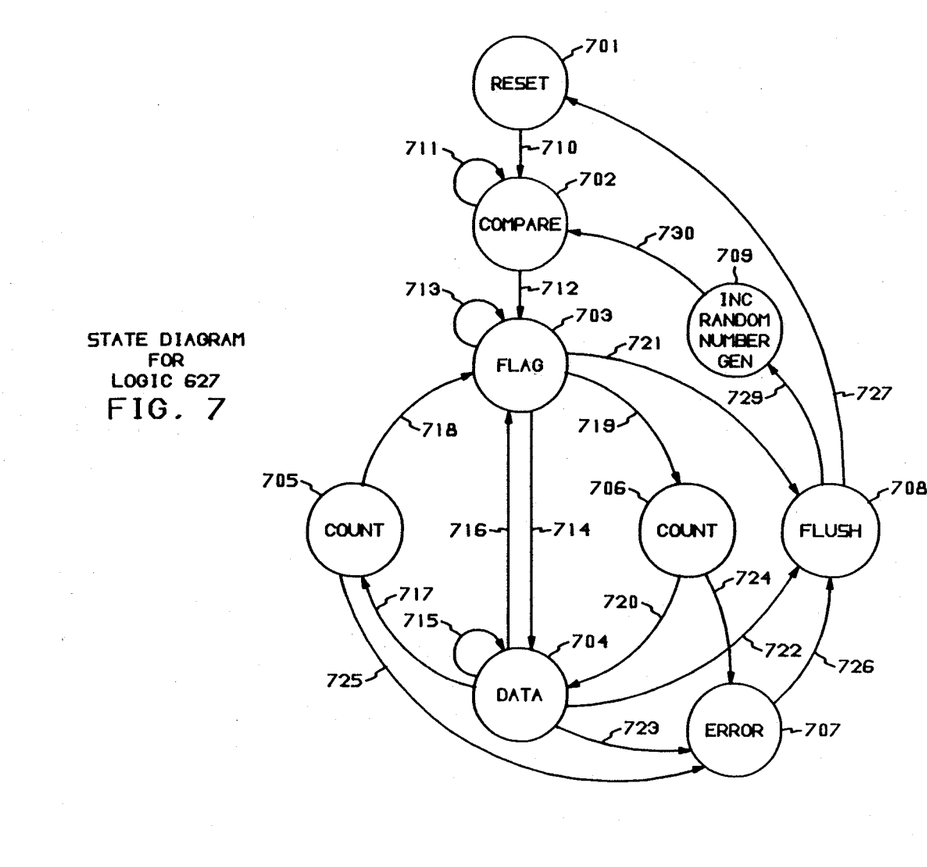
FIG. 7 illustrates, in state diagram form, the operation of RFR 306.

RFR 326 is illustrated in greater detail in FIG. 6. Logic block 627 provides overall control of RFR 326; and FIG. 7 illustrates, in state diagram form, the various states which logic block 627 of FIG. 6 can occupy. Blocks 629 through 634 are responsible for generating the flags with each flag having five bytes. There are two multibyte shift registers and one multibyte comparator in RFR 326. The first multibyte shift register is used to receive the data from input conductor 348 and includes shift registers 620 through 624. These shift registers function as one overall shift register with each shift register holding eight bits or one byte of data. The multibyte comparator includes comparators 610 through 614. The mismatch or match signals are transmitted from comparators 610 through 614 via conductors 640 through 644, respectively. The second multibyte shift register is used to store and shift the flag bytes and includes shift registers 600 through 604. Shift register 600 is loaded one byte at a time from flag memory 633 under control of a signal received from logic block 627 via conductor 655 into the load input of shift register 600. Shift registers 600 through 604 perform a shift operation in response to a clocking signal from logic block 627 via conductor 646. Shift registers 600 through 604 and 620 through 624 can be cleared to all zeros by the transmission of a signal from logic block 627 via conductor 645.

Consider now the operation of RFR 326 assuming that logic block 627 is in compare state 702 of FIG. 7. In that state, logic block 627 is attempting to achieve synchronization first at the bit level and then at the byte level with flags that are being received via conductor 348. For each bit received via 348 by shift register 620, logic block 627 loads the first byte of the flag into shift register 600 by transmission of signal via conductor 655. The first byte of the flag is selected by logic block 627 clearing counter 634. Counter 634 is used to access the individual bytes of flag memory 633. The determination of which flag is to be utilized from flag memory 633 is in response to address information received from random number generator 630 via conductor 651. The control of random number generator 630 will be discussed later.

When comparator 610 indicates a match for a particular sequence of bits in shift register 620, logic block 627 causes shift register 600 to shift this first byte into shift register 601 in synchronization with the receipt of next byte via conductor 348. Logic block 627 controls that shift operation by transmission of clock signals via conductor 646 to shift registers 600 through 604. This match on the first flag byte indicates that potentially the first flag byte has been identified but the other flag bytes must be found in the proper sequence before flag synchronization is achieved.

After the second byte has been received from conductor 348, logic block 627 loads the second flag byte from flag memory 633 by properly controlling counter 634 and the transmission of a signal on conductor 655. The matching process continues until all five bytes of the flag have been identified as being received via conductor 348. Logic block 627 remains in compare state 702 via path 711 during this process. If all five bytes of the flag are not received correctly, the process is repeated.

Once all comparators 611 through 614 indicate matches on conductors 640 through 644, respectively, logic block 627 enters flag state 703 via path 712. Absent errors occurring on the data transmission via trunk 118, logic block 627 remains in state 703 until four bytes of data have been received via conductor 348 and then transfers to data state 704. This condition is indicated on conductors 640 through 644 by a hexadecimal 10 where conductor 640 represents the least significant byte. This condition indicates that the next data byte received will result in the first data byte being shifted out of shift register 624 via conductor 654.

After logic block 627 is in the data state 704 and the first bit of the first byte of data is being outputted by shift register 624 onto conductor 654, logic block 627 transmits the hold signal via conductor 342 which enables the data to be transmitted on conductor 345 via AND gate 625 and conductor 654 and the clock signals on conductor 347 via AND gate 626. In addition, logic block 627 transmits the initial sequence correct signal on conductor 352, the flag valid signal on conductor 344 and the flag bits serially on conductor 346 from the output shift register 604. The flag bits are constantly being sent on conductor 346. They will stop when flag valid signal on conductor 344 becomes active which indicates transmission of a valid start flag on conductor 346.

Logic block 627 remains in data state 704 until the next flag which consists of five bytes is detected by comparators 610 through 614. When the flag is detected, logic block 627 transfers back to flag state 703 via path 716. While logic block 627 is in data state 704, it is constantly checking for the next flag by comparing the contents of shift registers 600 through 604 with the contents of shift registers 620 through 624. When the five bytes of a flag are detected, logic block 627 ceases to transmit the hold signal via conductor 342. Absent transmission errors, when all five bytes of the flag have been detected by comparators 610 through 614, these comparators transmit to logic block 627 via conductors 640 through 644 a hexadecimal 1E. Absent transmission errors, logic block 627 remains in flag state 703 until the comparators 610 through 614 transmit a hexadecimal 10 to logic block 627.

The previous discussion had assumed that no transmission errors were occurring on trunk 118. As long as both trunk controllers on either end of trunk 118 are in flag synchronization and absent transmission errors, the bytes of a flag should never occur in data because of the actions of block 303 and similar blocks. However, it is possible for transmission errors to occur, and logic block 627 assumes the occurrence of these transmission errors and allows up to two bytes of a flag to be incorrect before assuming that flag synchronization has been lost. Logic block 627, however, maintains a count of these types of errors; and when the count exceeds a predetermined value, which is assumed to be five in the present system, then, logic block 627 declares that flag synchronization has been lost. The remaining portion of the receiving trunk controller uses standard error detection and correction methods to detect and recover from errors in the data.

Assuming transmission errors, consider the situation where logic block 627 is in data state 704. As long as comparators 610 through 614 indicate that for any sequence of five bytes of data that less than two flag bytes have been detected in this sequence, logic block 627 remains in the data state via path 715. However, if comparators 610 through 614 detect that three or more bytes of the flag have been detected in the current five byte sequence, logic state 627 enters count state 705 via path 717. In state 705, logic block 627 increments in internal counter and transfers to flag state 703 via path 718.

Similarly, if logic block 627 is in flag state 703 and detects two or less bytes of the flag in the current five byte sequence in shift registers 620 through 624, it remains in flag state 703 via path 713. However, if three or more bytes of the flag are detected in the current five byte sequence in shift registers 620 through 624, logic block 627 transfers to count state 706 via path 719. In count state 706, the internal counter is updated. If the internal counter is less than the predetermined value, the logic block immediately transfers into data state 704 via path 720.

If in either count state 705 or 706, the predefined value is exceeded by the value of the internal counter, error state 707 is entered via path 725 or 724, respectively. Upon entering error state 707, logic block 727 transmits a reset signal via conductor 350 and transmits the packet abort signal via conductor 349. In addition, logic block 627 ceases to transmit the flag valid signal via conductor 344 and hold signal via conductor 342.

Logic block 627 transfers from error state 707 to flush state 708 via path 726. While in state 708, logic block 627 transmits a signal via conductor 645 which clears shift registers 600 through 604 and 620 through 624. In addition, logic block 627 transmits a signal via conductor 647 to register 629. This signal causes register 629 to be reset to the initial value causing the initial seed and key to be accessed from seed memory 632 and key memory 631. The outputs of these two memories is received by random number generator 630 via paths 652 and 653. In response, random number generator 630 accesses the initial flag from flag memory 633 via path 651. Once these operations are accomplished, logic block 627 transfers to reset state 701 via path 727.

Also, logic block 627 can enter error state 707 via path 723 from data state 704 if logic block 627 detects that a packet has exceeded the maximum length.

In addition, logic block 627 can be driven out of flag state 703 or data state 704 to flush state 708 via paths 721 or 722, respectively, upon receipt of a reset or user reset signal received via conductors 350 or 370. Conductor 350 is a bilateral path. The generation of these signals is described with respect to the idle transmitter 301 of FIG. 5. The user reset causes logic block 627 to transfer to the state 709 via path 729 from flush state 708. State 709 increments the contents of register 629 hence causing a change of the seed and key that is utilized by random number generator 630.

Figure 8:
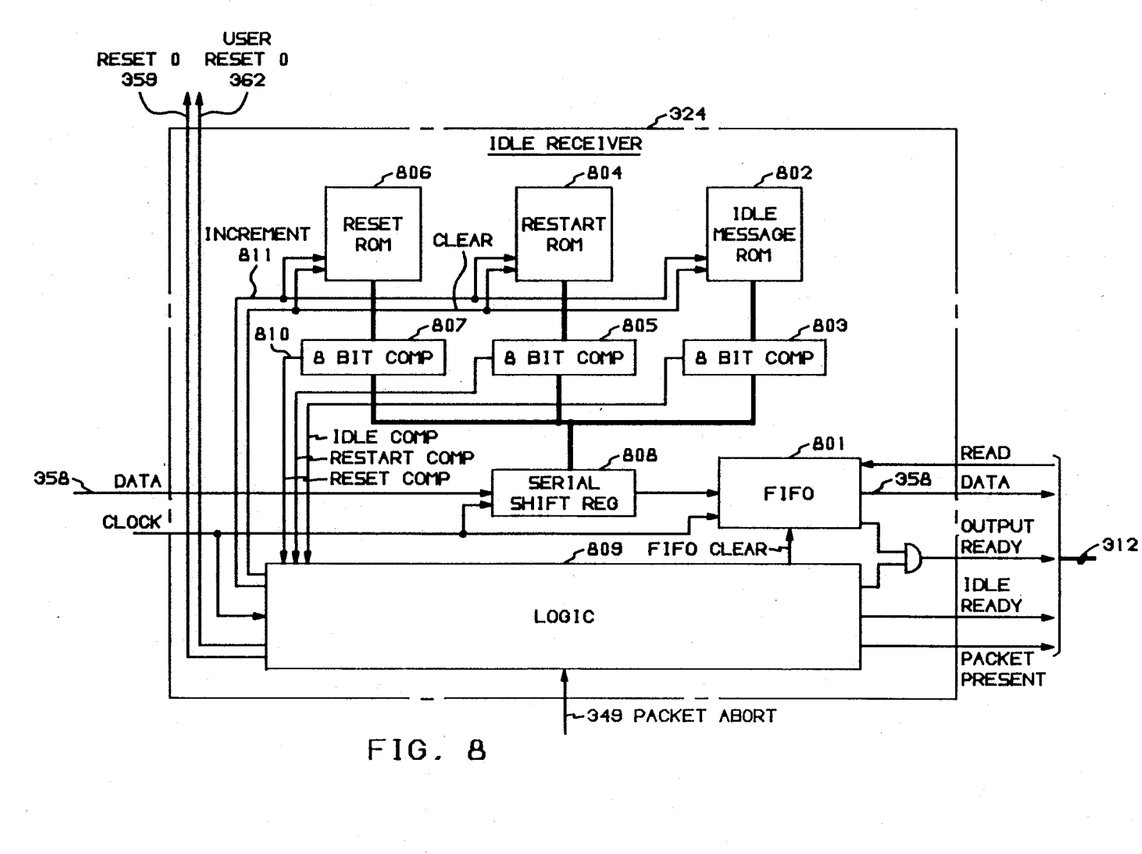
FIG. 8 illustrates, in greater detail, idle receiver 324 of FIG. 4.

FIG. 8 illustrates, in greater detail, idle receiver 324 of FIG. 3. As data is received via conductor 358 from flag unaliasor 325, it is clocked into register 808. Each byte is then compared by the three ROM-comparator pairs, 802 and 803, 804 and 805, and 806 and 807 that check for the idle, restart, and reset patterns, respectively. The restart pattern is contained in a user reset packet. If one of these patterns is detected, a signal is transmitted to logic 809 that increments the ROMs to the next work of the pattern. For example, if the first word of the reset pattern is detected, the reset compare signal is transmitted via conductor 810 to logic 809 from comparator 807. Logic 809 then transmits the increment signal via conductor 811 that increments ROM 806 to the next byte of the reset pattern. After logic 809 determines that the entire pattern has been received, it then transmits the appropriate signal on either conductor 359 or 360. In addition, the data is transferred from register 808 to FIFO 801 where it is subsequently communicated via cable 312. ROM-comparator pairs 802 and 803 and 804 and 805 function in a similar manner.

If Idle Receiver 324 receives the packet abort signal via conductor 349 from RFR 326 for a predetermined period of time, it generates the reset 0 signal on conductor 359. This will synchronize the system if both RFR 326 and RFR 306 have lost flag synchronization.

Figure 9:
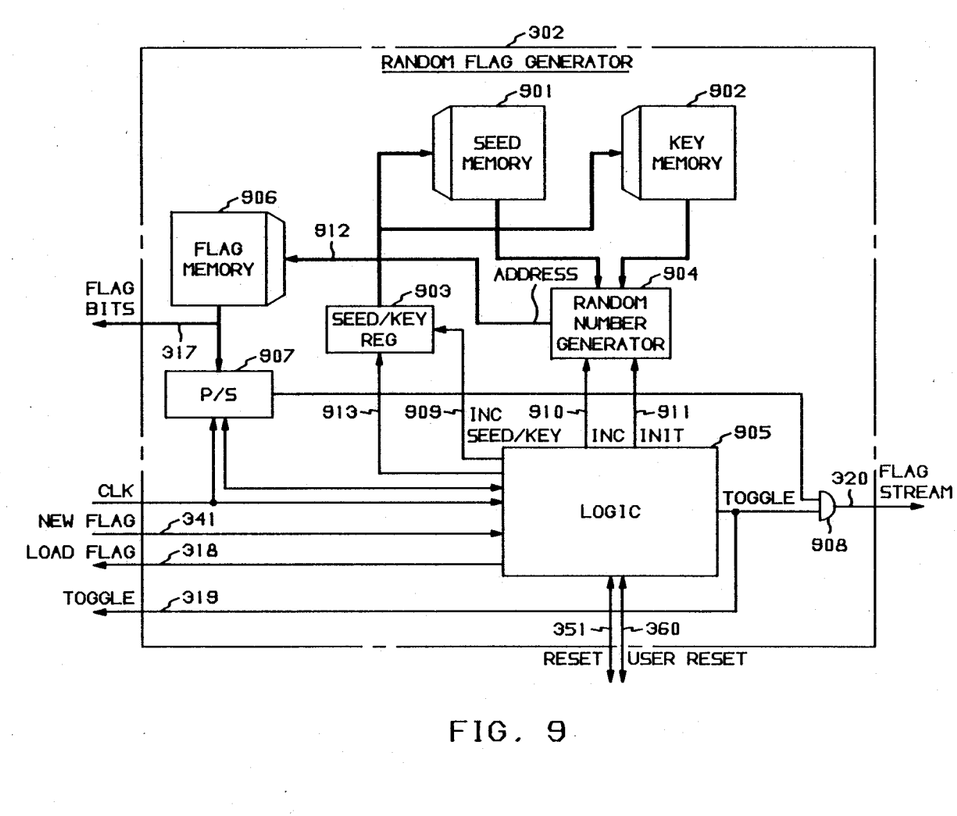
FIG. 9 illustrates, in block diagram form, random flag generator RFG 302 of FIG. 3.

RFG 302 is illustrated in greater detail in FIG. 9. During normal operation, logic circuit 905 is responsive to the new flag signal received via conductor 341 to generate the increment signal via conductor 910 to random number generator 904. Random number generator 904 is responsive to the latter signal and the seed and key received from seed memory 901 and key memory 902, respectively, to generate address signals that are transmitted via cable 912 to flag memory 906. These address signals access on of the flags stored in flag memory 906 that is then transmitted to parallel-to-serial converter 907 and block 303 via cable 317. Parallel-to-serial converter 907 converts the flag into a serial stream which is then transmitted via AND gate 908 to OR gate 307 via conductor 320. In addition, logic 905 transmits the toggle signal via conductor 319 to block 303.

Logic 905 is responsive to a user reset signal received via conductor 351 to transmit the INIT signal via conductor 911 to random number generator 904. This causes random number generator 904 to start the random sequence for the next flag based on the current seed being received from the seed memory 901 and the key memory 902, respectively. In addition, the increment seed/key signal is transmitted via conductor 909 which causes seed/key register 903 to be incremented. If a reset signal is received via connector 351, logic 905 transmits the INIT signal via conductor 911 and also transmits a signal via conductor 913 that resets the seed/key register to a known value.

It is to be understood that the above-described embodiment is merely illustrative of the principles of the invention and that other arrangements may be devised by those skilled in the art without departing from the spirit and scope of the invention.

We claim:

1. A packet switching system for the communication of a plurality of packets and flags utilized to separate said packets during communication comprising:
   means for randomly encrypting only said flags separating packets upon transmission of said packets and said flag; and
   means for decrypting said randomly encrypted flags upon receipt of said packets and said flags.

2. The packet switching system of claim 1 wherein said decrypting means comprises means for synchronizing with said randomly encrypted flags.

3. The packet switching system of claim 2 wherein said encrypting means comprises means for generating a predetermined sequence of said randomly encrypted flags upon initialization; and
   said synchronizing means comprises means for detecting said predetermined sequence of said randomly encrypted flags thereby achieving flag synchronization.

4. The packet switching system of claim 3 wherein said decrypted means further comprises means for detecting the loss of said flag synchronization; and
   means responsive to the detection of said loss of said flag synchronization for initializing said encrypting means.

5. The packet switching system of claim 4 wherein said initializing means comprises means for transmitting a predetermined packet to said encrypting means; and
   said encrypting means further comprises means responsive to said predetermined packet for initializing said encrypting means.

6. The packet switching system of claim 5 wherein each of said flags includes a plurality of bytes and said synchronizing means comprises means for maintaining synchronization upon up to a predetermined number of said bytes being incorrect within any particular one of said flags.

7. The packet switching system of claim 6 wherein said synchronizing means further comprises means for maintaining synchronization upon up to said predetermined number of said bytes of the current flag appearing in the data of the current packet.

8. Apparatus for the prevention of unauthorized detection of the start and end of packets and for use with trunk controllers of packet switching networks that are formed into a packet switching system by interconnecting said trunk controllers of each switching network by trnks* to other trunk controllers of other packet switching networks, wherein in a first one of said trunk controller is communicating packets to a second one of said trunk controller via a first one of said trunks, said apparatus comprising:
   a plurality of means for encrypting each connected to an individual trunk controller and connected to an individual trunk;
   a plurality of means for decrypting each connected to an individual trunk controller and connected to an individual trunk;
   each one of said plurality of encrypting means comprises means for preparing packets for transmission from internal generated packets or packets received from the connected trunk controller;
   means for random generating a flag corresponding to each of the packets to be transmitted on the connected trunk controller thereby encrypting the generated flag;
   means for aliasing the data of each packet received from said preparing means with the corresponding flag received from said random generating means;
   means for each packet for first selecting the corresponding flag and then the packet for transmission on the connected trunk; and
   each of said plurality of means for decrypting comprises means responsive to the receipt of a flag and packet from the connected trunk for generating a flag corresponding to the received flag by maintaining synchronization with the flags being received from the connected trunk to identify the start of the received packet;
   means responsive to the generated flag and the received packet for unaliasing the flag from the data of the packet;
   means for receiving the the unaliasing data of each packet to transfer said unaliased data to the connected trunk controller;
   said generating means of said one of said plurality of decrypting means connected to said second one of said trunk controllers comprises means for detecting the lack of correspondence between said generated flags and said received flags;

means for transmitting a first reset signal to said preparing means of said one of said plurality of encrypting means said second one of said trunk controllers upon detection of said lack of correspondence;

said preparing means of said one of said plurality of encrypting means of said second one of said trunk controllers comprise means for assembling a reset packet for transmission to said first one of said trunk controllers via said aliasing means and said selecting means of said one of said plurality of encrypting means of said second one of said trunk controllers and said first one of said trunks;

said generating means of said one of said plurality of decrypting means of said second one of said trunk controllers comprise means responsive to said lack of correspondence for initializing said generating means to generate an initial flag pattern upon receipt of said reset packet from said first one of said trunks;

said receiving means of said one of said plurality of decrypting means of said first one of said trunk controllers comprise means responsive to said reset packet for generating a second reset signal; and said random generating means of said one of said plurality of encrypting means of said first one of said trunk controllers comprises means responsive to said second reset signal for initializing said random generating means to generate said initial flag pattern thereby regaining synchronization with said one of said plurality of decrypting means of said second one of said trunk controllers.

9. The apparatus of claim 8 wherein said receiving means of said one of said plurality of decrypting means of said second one of said trunk controllers further comprises means for producing a third reset signal upon receipt of said first reset signal for a predetermined period of time; and said random generating means of said one of said plurality of encrypting means of said second one of said trunk controllers comprises means for initializing said random generating means to generate said initial flag pattern thereby regaining synchronization with said one of said plurality of decrypting means of said second one of said trunk controllers.

10. The apparatus of claim 9 wherein said preparing means of said one of said plurality of encrypting means of said first one of said trunk controllers comprises means responsive to the generation of a predetermined number of flags by said generating means of said one of said plurality of encrypting means of said first one of said trunk controllers for assembling a restart packet and producing a user reset signal;

said generating means of said one of said plurality of encrypting means of said first one of said trunk controllers responsive to said user reset signal to generate another sequence of random flags; and said generating means of said one of said plurality of decrypting means of said second one of said trunk controllers responsive to said receipt of said restart packet to generate said other sequence of random flags.

11. A method for preventing the unauthorized detection of the start and end of packets being transmitted in a packet switching system for transmission of packets and flags to separate said packets during transmission with said packet switching system having packet switching networks including communication controllers and said packet switching networks being interconnected by communication paths between said networks and each end of said communications paths terminates on an individual one of said communication controllers, said method comprising the steps of:

only encrypting flags separating packets upon transmission of said packets; and said flags; and decrypting said encrypted flags upon receipt of said packets and said flags.

12. The method of claim 11 wherein said decrypting step comprises the step of synchronizing with said encrypted flags.

13. The method of claim 12 wherein said encrypting step comprises the step of generating a predetermined flag pattern upon initialization; and said synchronizing step comprises the step of detecting said predetermined flag pattern thereby achieving flag synchronization.

14. The method of claim 13 wherein said decrypting step further comprises the steps of detecting the loss of said flag synchronization; and initializing said encrypting step in response to the detection of the loss of said flag synchronization.

15. The method of claim 14 wherein said initializing step comprises the step of transmitting a predetermined packet to said encrypting step; and said encrypting step further comprises the step of restarting to initialize said encrypting step in response to said predetermined packet.

16. The method of claim 15 wherein each of said flags includes a plurality of bytes and said synchronizing step comprises the step of maintaining synchronization upon up to a predetermined number of said bytes being incorrect within any particular one of said flags.

17. The method of claim 16 wherein said synchronizing step further comprises the step of maintaining synchronization upon up to said predetermined number of said bytes of said current flag appearing in the data of the current packet.

* * * * *